United States Patent [19]
DuRocher et al.

[11] Patent Number: 5,090,730
[45] Date of Patent: Feb. 25, 1992

[54] VEHICLE STEERING COLUMN APPARATUS

[75] Inventors: Dan DuRocher, Leanord; Ellsworth S. Miller, Rochester Hills, both of Mich.

[73] Assignee: ITT Corporation, New York, N.Y.

[21] Appl. No.: 644,719

[22] Filed: Jan. 23, 1991

[51] Int. Cl.⁵ ............................................. B62D 1/04
[52] U.S. Cl. ................................... 280/775; 74/493; 280/779
[58] Field of Search ................ 280/775, 779, 780; 74/492, 493

[56] References Cited

U.S. PATENT DOCUMENTS

| | | |
|---|---|---|
| 725,574 | 4/1903 | Locke . |
| 2,611,047 | 9/1952 | Barcus .................................. 200/59 |
| 2,781,429 | 2/1957 | Mappes et al. ................... 200/61.37 |
| 2,830,146 | 4/1958 | Lauer ................................ 200/61.37 |
| 4,086,825 | 5/1978 | Badcock et al. ...................... 74/492 |
| 4,175,449 | 11/1979 | Manning et al. ...................... 74/492 |
| 4,217,792 | 8/1980 | Kesling ............................. 74/484 R |
| 4,218,595 | 8/1980 | Honjo ................................ 200/61.54 |
| 4,257,624 | 3/1981 | Hansen ................................. 280/775 |
| 4,287,786 | 9/1981 | Berginski ................................ 74/492 |
| 4,307,626 | 12/1981 | Sanada et al. ......................... 280/775 |
| 4,334,130 | 6/1982 | Berg ................................. 200/61.54 |
| 4,336,428 | 6/1982 | Berginski ........................... 200/61.54 |
| 4,379,954 | 4/1983 | Iwata et al. ............................. 200/4 |
| 4,393,280 | 7/1983 | Iwata et al. ............................. 200/4 |
| 4,400,990 | 8/1983 | Cook et al. ............................ 74/492 |
| 4,404,438 | 9/1983 | Honjo ................................ 200/61.54 |
| 4,411,331 | 10/1983 | Hanada .................................... 180/78 |
| 4,423,295 | 12/1983 | Contato ............................. 200/61.27 |
| 4,442,688 | 4/1984 | Saegusa ................................ 280/775 |
| 4,495,833 | 1/1985 | Fourrey et al. ....................... 280/775 |
| 4,541,298 | 9/1985 | Strutt .................................... 280/775 |
| 4,543,848 | 10/1985 | Beauch ................................... 74/493 |
| 4,601,215 | 7/1986 | Barnabe et al. ........................ 74/492 |
| 4,660,673 | 4/1987 | Yoshii .................................... 180/334 |
| 4,716,780 | 1/1988 | Nishikawa et al. ..................... 74/493 |
| 4,753,121 | 6/1988 | Venable et al. ........................ 74/493 |
| 4,774,851 | 10/1988 | Iwanami et al. ....................... 74/493 |

FOREIGN PATENT DOCUMENTS 3433635  3/1986  Fed. Rep. of Germany ........ 74/492

Primary Examiner—Kenneth R. Rice
Attorney, Agent, or Firm—Robert P. Seitter; J. Gordon Lewis

[57] ABSTRACT

A hollow, tubular steering column jacket surrounds a hollow, tubular steering column shaft. First and second brackets are fitted into the first and second ends of the jacket for mounting the jacket to the stationary structure of a vehicle at one end and to receive a steering column switch assembly and a steering wheel at another end. A third bracket may be mounted intermediate the first and second ends of the jacket and to the vehicle for providing selective pivoting of the jacket with respect to the first end of the jacket. The steering column shaft has an integrally formed yoke at one end. The opposite end of the steering column shaft is formed for attachment to a vehicle steering wheel.

23 Claims, 5 Drawing Sheets

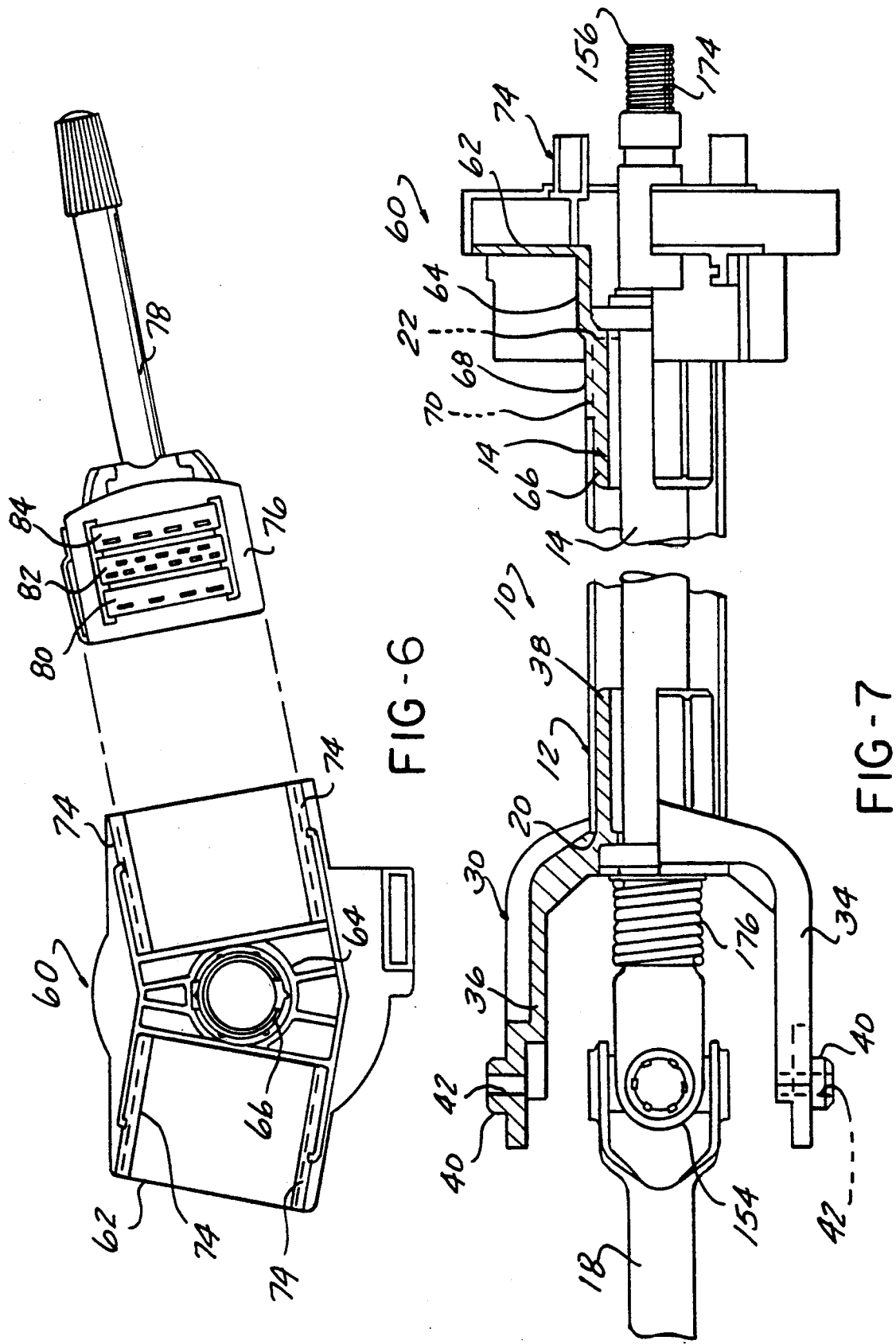

VEHICLE STEERING COLUMN APPARATUS

BACKGROUND OF THE INVENTION

1. Field of the Invention

The present invention relates, in general, to steering columns for motor vehicles.

2. State of the Art

Conventional steering column apparatus or assemblies for motor vehicles include an elongated, axial steering column shaft which is connected at one end to a steering wheel and at a lower end to a tail shaft. A jacket concentrically surrounds at least a portion of the steering column shaft, with the ends of the steering column shaft extending outward from opposed ends of the jacket.

Various brackets are mounted on the jacket to mount the jacket in the vehicle and to attach various devices, such as an ignition lock, steering column switch modules and control levers, etc., to the jacket. For tiltable steering columns, a bracket containing a pivot and a release lock lever mechanism is also mounted on the jacket, typically intermediate the ends of the jacket to provide selective tilting of the steering column apparatus to accommodate a driver's size and driving position preference.

Since the steering column jacket is made of metal, i.e., steel, the brackets are typically attached to the jacket via welding. However, this creates several disadvantages. The brackets mounted on the jacket are also made of metal which adds significant weight to the steering column apparatus. Welding operations are also costly in terms of labor and/or welding equipment. Welding also has uncertain reliability since there is no convenient way to determine if a proper high strength weld has been made, without resorting to destructive testing. Misaligned brackets or brackets attached to the jacket with low strength welds result in scrap which adds to overall costs.

The construction of the steering column shaft in a conventional steering column apparatus encounters similar problems. Typically, the steering column shaft is a solid, metallic tubular member. The lower yoke and upper threaded member separate members which are welded to the shaft to connect the steering column shaft to the lower tail shaft and the steering wheel, respectively. This entails the use of additional, separate elements which results in a higher overall weight for the steering column shaft, higher cost due the use of additional components and potential reliability problems when the yoke and threaded member are welded to the tubular shaft.

Thus, it would be desirable to provide a steering column apparatus which is constructed without any welds. It would also be desirable to provide a steering column apparatus in which the various mounting, tilt and accessory brackets are attached to the steering column jacket without the use of welding operations. It would also be desirable to provide a steering column apparatus which includes a steering column shaft which is constructed without the use of welding. It would also be desirable to provide a steering column shaft which is constructed as a one-piece, integral member without the use of separate members welded to a tubular shaft as is conventional. Finally, it would be desirable to provide a steering column apparatus which has a lower manufacturing cost, lower weight, greater manufacturing adjustability and greater reliability than conventionally constructed steering column apparatus.

SUMMARY OF THE INVENTION

The present invention is a vehicle steering column apparatus which provides many significant advantages over conventional steering column apparatus.

In a preferred embodiment, the vehicle steering column apparatus includes a hollow tubular jacket having first and second opposed ends. A first bracket means is fitted into the first end of the jacket and is fixedly connectible to the vehicle. A second bracket means is fitted into the second end of the jacket and removably receives a lever controlled steering column switch means for operating various electrical devices on the vehicle upon selective movement of the lever. A steering column shaft is rotatably mounted within the jacket and extends outward from the first and second ends of the jacket for connection to the vehicle steering wheel at one end and to the vehicle steering linkage tail shaft at the other end.

A third bracket means may be mounted intermediate the first and second ends of the jacket and to the vehicle. The third bracket means preferably includes pivot means for pivoting the steering column jacket about the first end thereof to any desired angular position.

The steering column shaft is uniquely constructed as a one-piece, integral member by first slitting one end of the steering column shaft and bending the side wall portions formed by the slit into two spaced arms. A bore and a outwardly extending projection are formed in each of the arms by a T-drill operation. This forms an integral yoke at one end of the steering column shaft to enable the steering column shaft to be connected to a tail shaft on the vehicle. However, the yoke is integral with and formed as a non-separate extension of the steering column shaft thereby eliminating the need for a separate yoke member which is conventionally welded to the steering column shaft. This eliminates the welding operation thereby providing a lower cost steering column shaft which has greater reliability than previously constructed steering column shafts. The opposite end of the steering column shaft is formed for direct connection to a vehicle steering wheel thereby eliminating a separate threaded member which is conventionally welded to the shaft.

The present invention also comprises a unique method of constructing a vehicle steering column apparatus in which first and second bracket means are fitted into the first and second ends of a hollow, tubular jacket. These unique steps eliminate the need for welding operations previously employed to attach the first and second brackets to the steering column jacket. This results in a significant reduction in weight and cost for the steering column apparatus of the present invention as compared to previously constructed steering column apparatus. Further, since no welding operations are employed, the reliability of the steering column shaft is greatly improved.

Finally, the present invention encompasses a unique method of constructing a steering column shaft. This method includes the steps of slitting a first end of a hollow tubular shaft. The side wall portions formed by the slit are bent outward to form two spaced arms which are an integral extension of the hollow shaft. A boss and bore are formed in each arm by a T-drill operation to form a yoke at the first end of the steering column shaft. Threads are formed on the second end of the hollow shaft for connection to a steering wheel.

This method creates a one-piece, hollow steering column shaft which includes integral yoke and threaded end portions and eliminates the need for welding a separate yoke and a separate threaded member to the steering column shaft as is conventional.

BRIEF DESCRIPTION OF THE DRAWING

The various features, advantages and other uses of the present invention will become more apparent by referring to the following detailed description and drawing in which:

FIG. 6 is a rear elevational view of the second bracket means showing the mounting of the steering column switch assembly therein;

FIG. 7 is a partially cross-sectioned, side elevational view of the opposed ends of the steering column apparatus shown in FIG. 1;

DESCRIPTION OF THE PREFERRED EMBODIMENTS

Figure 1:
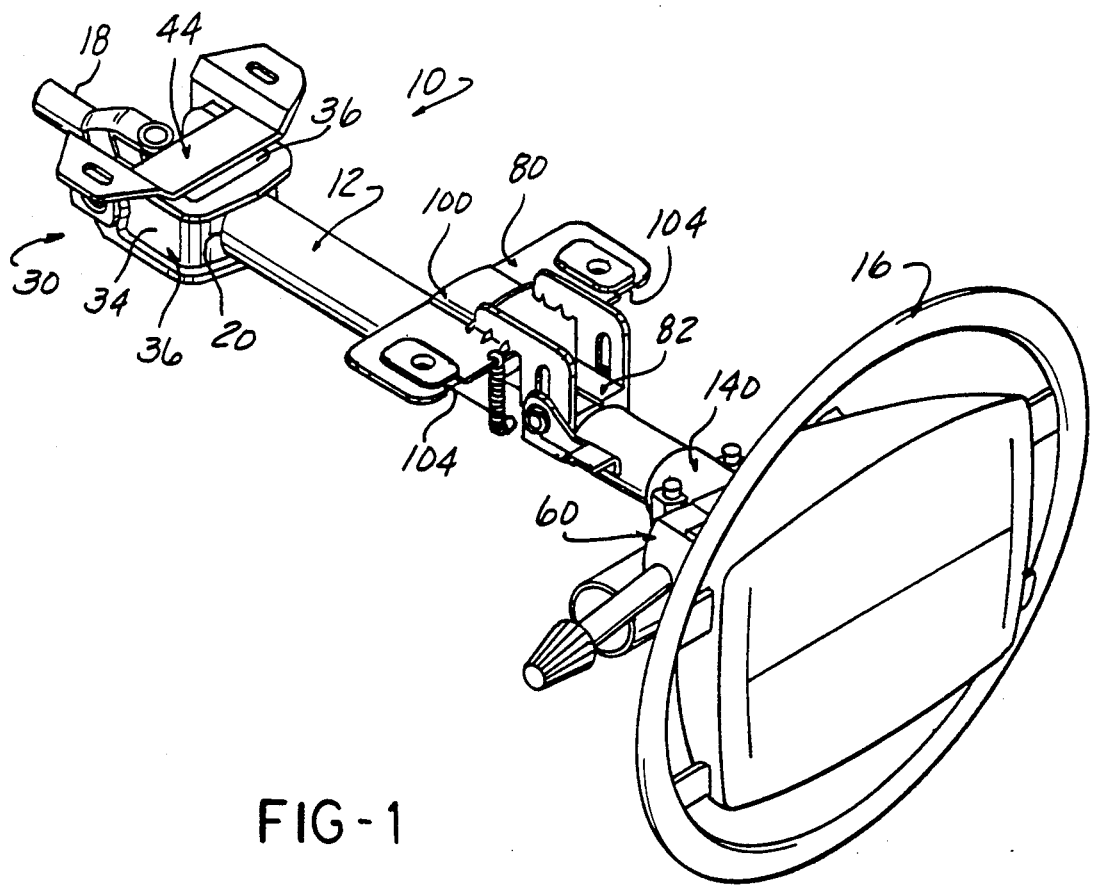
FIG. 1 is a perspective view of a steering column apparatus constructed in accordance with the teachings of the present invention.

Referring now to the drawing, and to FIG. 1 in particular, there is depicted a steering column apparatus 10 for use in a motor vehicle, such as an automobile. The steering column apparatus 10 is uniquely constructed with a low cost, low weight and high reliability.

Figure 2:
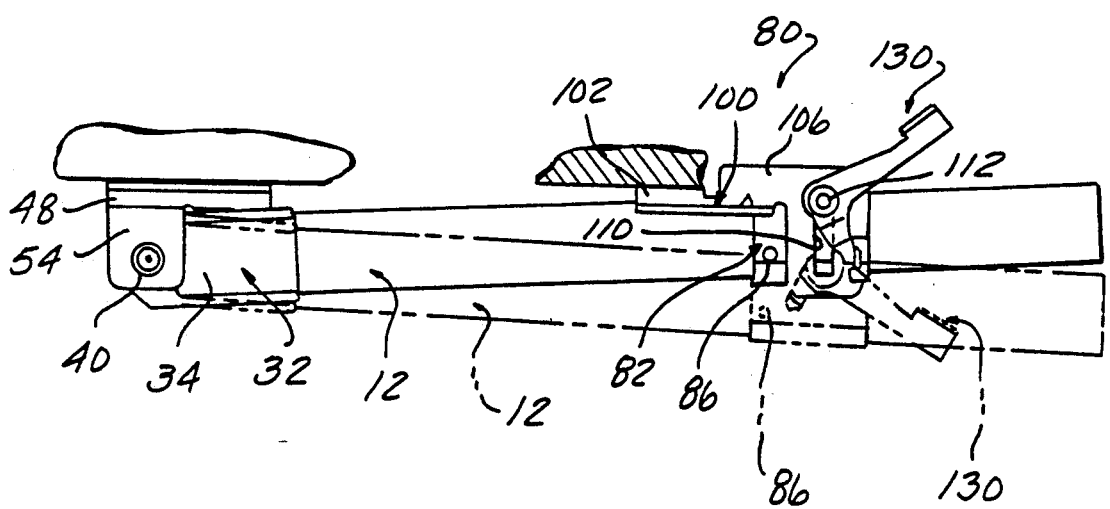
FIG. 2 is a partial, side elevational view of the steering column apparatus shown in FIG. 1.

As shown in FIG. 1, and in greater detail in FIGS. 2 and 7, the steering column apparatus 10 includes a jacket 12 which concentrically surrounds a steering column shaft 14 connected at a first or upper end to a steering wheel 16 and at a second, opposed lower end to a tail shaft 18 which is in turn connected to the conventional vehicle steering linkage, not shown. Various brackets are mounted to the jacket 12 to attach the jacket 12 and the entire steering column apparatus 10 to the stationary structure of the vehicle and, as described in a preferred embodiment, to provide selective pivoting or tilting of the steering column apparatus 10 to suit a driver's size and operating position preference.

The jacket 12 is formed as a hollow, tubular member from a high strength material, such as steel. The jacket 12 has a first end 20 and an opposed, second end 22, as shown in FIG. 7. Several slots and through bores are formed in the jacket 12, as will be described in greater detail hereafter, for mounting various brackets to the jacket 12. Although the jacket 12 is preferably a one-piece member as shown in FIGS. 1 and 7, the jacket 12 may also be formed of two or more tubular members unitarily interconnected or telescopingly arranged.

Figure 3:
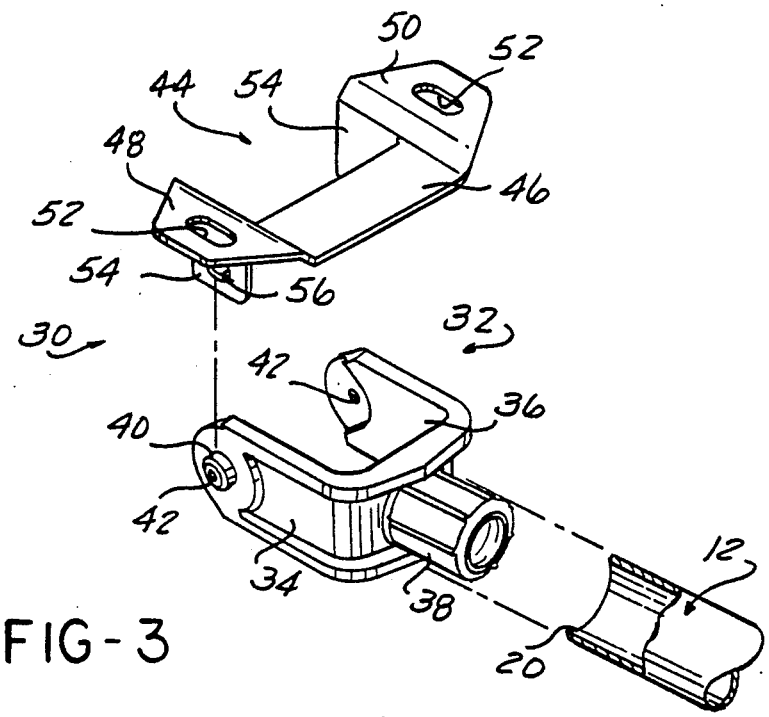
FIG. 3 is an exploded, perspective view of the first bracket means shown in FIG. 1.
Figure 4:
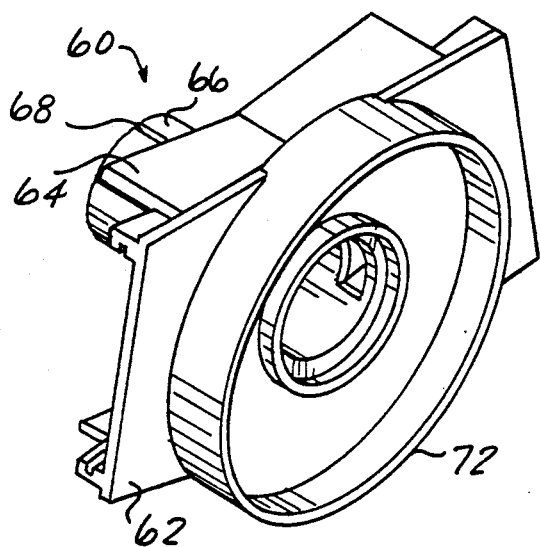
FIG. 4 is a perspective view of the second bracket means shown in FIG. 1.

As shown in FIGS. 1 and 2, and in greater detail in FIGS. 3 and 7, the steering column apparatus 10 includes a first bracket means 30 which is fitted into the first end 20 of the jacket 12 and is fixedly connectible to the stationary structure of the vehicle for mounting one end of the jacket 12 to the vehicle. In a preferred embodiment, the first bracket means 30 is constructed to provide pivotal movement of the jacket 12 and the entire steering column assembly 10 about the first end of the jacket 12 so as to enable selective tilting to the steering column apparatus 10 as described in greater detail hereafter.

In the preferred embodiment, the first bracket means 30 includes a yoke 32 which is formed with two spaced, opposed legs 34 and 36 which are interconnected by a central bight section 37. Outwardly extending projections or trunnions 40 are formed at one end of each of the arms 34 and 36. A bore 42 is formed in each trunnion 40. The trunnions 40 are designed to shear under a longitudinal force exerted on the jacket 12 to provide energy management during a collision. The bores 42 are variable in diameter to provide a tunable shear force for the trunnions 40. A clevis pin, not shown, may be inserted into the bores 42 for additional reinforcement.

A tubular boss 38 extends outward from the central bight section 37. The boss 38 is sized so as to be fitted, such as by a press fit, for example, into the first end 20 of the jacket 12.

The yoke 32 is preferably injection molded from a suitable, high strength plastic. For additional strength, a thin metallic strip may be insert molded into the arms 34 and 36 in the central bight section 37.

The first bracket means 30 also includes a first plate 44. The first plate 44 is formed with a planar central portion 46 and two, opposed side flanges 48 and 50. Slots 52 are formed in each of the side flanges 48 and 50 for receiving fasteners to adjustably mount the first bracket means 30 to stationary vehicle structure.

The first plate 44 also includes a pair of depending arms 54. An aperture 56 is formed in each of the arms 54 and is pivotally mounted about one of the trunnions 40 on the yoke 32 to pivotally interconnect the first plate 44 and the yoke 32. In this manner, the first or lower end 20 of the jacket 12 is pivotally mounted to the stationary structure of the vehicle, such as the vehicle body panels adjacent the firewall in the interior passenger compartment of the vehicle.

Figure 5:
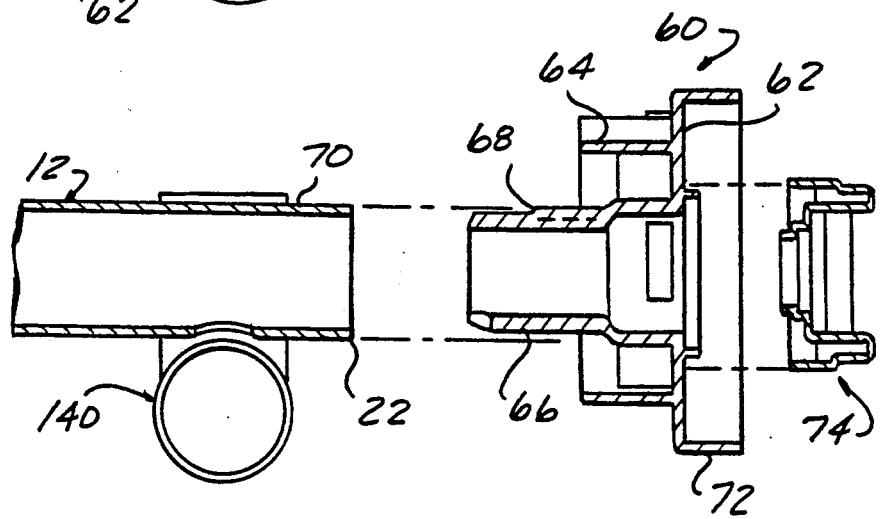
FIG. 5 is a longitudinally cross-sectioned, exploded view showing the mounting of the second bracket means to the steering column jacket.

A second bracket means 60 is mounted to the jacket 12 by being fitted into the second end 22 of the jacket 12. As shown in FIG. 1, and in greater detail in FIGS. 4-7, the second bracket means 60 includes a base 62. A first annular flange 64 extends outward from one side of the base 62 and concentrically surrounds a tubular sleeve 66 which also extends outward from the base 62. The sleeve 66 is adapted to be fitted into the second end 22 of the jacket 12 as shown in FIG. 5. By way of example only, the sleeve 66 is sized and shaped to be press fit into the second end 22 of the jacket 12. A projection or key 68 is formed on an upper surface of the sleeve 66 and engages a complimentarily-shaped slot 70 which opens inward from the second end 22 of the jacket 12 to stationarily position the sleeve 66 with respect to the jacket 12.

A second annular flange 72 extends outward from the opposite surface of the base 62 and, in electrical air bag steering column applications, receives the air bag electrical interface commonly referred to as the "clockspring". An apparatus 73 is formed in the base 62 concentrically within the second annular flange 72 and receives a collar denoted in general by reference number 274 which acts as a bearing for one end of the steering column shaft, as described hereafter.

As shown in FIG. 6, the base 62 includes means for mounting a steering column switch means to the base 62. By way of example, the mounting means comprises spaced pairs of projections 74 which slidingly receive a steering column switch assembly housing 76. Separate housings 76 may be mounted on opposite sides of the sleeve 66. The housing 76 carries a control lever or stalk 78 which operates actuating mechanisms mounted within the housing 76. The actuating mechanisms control the operation and switching of various switch modules 280, 282 and 284 which are removably mounted in the housing 76. The switch modules 80, 82 and 84 control various electrical functions in the vehicle, such as headlights, turn signals, headlight beam change, etc. Further details concerning the construction of the steering column switch housing 76 can be had by referring to United States patent application Ser. No. 07/529,096, the contents of which are incorporated herein by reference. Other mounting means, such as fasteners, clamps, etc., may also be employed to mount the steering column switch means to the base 62 of the second bracket means 60.

The second bracket means 60 is preferably formed as an injection molded component from a suitable plastic, such as glass reinforced nylon.

Figure 8:
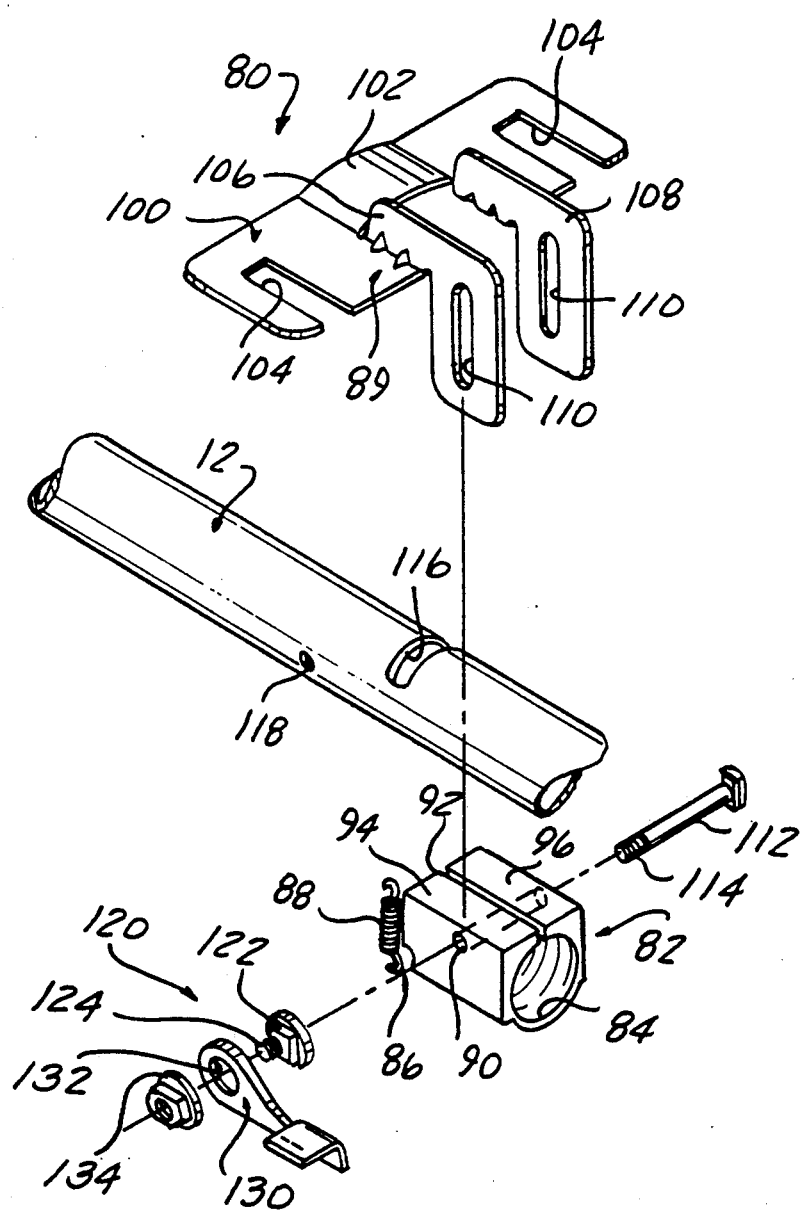
FIG. 8 is an exploded, perspective view of the third bracket means.

In order to provide a tilting capability to the steering column apparatus 10, a third bracket means denoted in general by reference number 80 in FIGS. 1, 2 and 8 is mounted on the jacket 12 intermediate the first and second ends 20 and 22, respectively, of the jacket 12. The third bracket means 80 is fixedly connected to the stationary structure of the vehicle at one portion and is pivotally adjustable with respect to the jacket 12 to enable the jacket 12 to be pivoted about the first end 20 to suit a driver's size and operating position preference.

The third bracket means includes a clamp block 82 formed of steel or plastic. The clamp block 82 has a generally square, cubical form and includes a first longitudinally extending through bore 84. The bore 84 is sized to fit about the jacket 12.

An outwardly extending projection or hanger 86 is mounted on one of the side walls of the clamp block 82 and provides a mounting attachment post for a biasing member, such as a coil spring 88. The projection 86 extends through the clamp block 82 into an aperture 118 in the jacket 12.

A second bore 90 extends through the clamp block 82 transverse to the first bore 84 and is positioned above and in partial communication with the first bore 84 as shown in FIG. 8. A slot 92 is formed in the clamp block 82 extending from a top surface to and opening into the first bore 84. This forms two top wall portions 94 and 96 in the clamp block 82.

The third bracket means 80 also includes a mounting plate preferably formed of steel. The mounting plate 100 is generally a planar member having a concave central portion 102 which is adapted to engage the circular surface of the jacket 12. One end of the biasing spring 88 is mounted in an aperture 89 in the mounting plate 100.

A pair of opposed slots 104 are formed on opposite sides of the mounting plate 100 and receive retainers 105, FIG. 1, and suitable fasteners, not shown, for attaching the mounting plate 100 to the stationary structure of the vehicle. The slots 104 and fasteners also provide for controlled collapsibility of the steering column apparatus 10 in that the fasteners slide out of the slots 104 when force is exerted on the steering wheel to collapse the steering column apparatus 10.

A pair of spaced, L-shaped arms 106 and 108 are integrally formed with and extend downward from the mounting plate 100. The arms 106 and 108 are adapted to be disposed adjacent opposite side walls of the clamp block 82. An arcuate-shaped slot 110 is formed in each of the arms 106 and 108 to provide for pivotal adjustment of the clamp block 82 with respect to the mounting plate 100, as described immediately below.

The third bracket means 80 includes releasable lock means for releasably locking the clamp block 82, the mounting plate 100 and the steering column jacket 12 in a one of a plurality of angular positions. The releasable lock includes an adjusting bolt 112. Preferably, the adjusting bolt 112 is provided with a plurality of double start external threads 114 extending from an outer end.

When the clamp block 82 is disposed about the steering column jacket 12, the second transverse bore 90 will be aligned with a transverse slot 116 formed in an upper surface of the steering column jacket 12, as shown in FIG. 8. The clamp block 82 is also pinned to the steering column jacket 12 by means of the projection or hanger 86 which extends through the clamping block 82 into the aperture 118 in the jacket 12. The adjusting bolt 112 extends through the clamp block 82 such that the external threads 114 extend outward from one side wall of the clamp block 82. An adjusting nut 120 has an internally threaded bore formed adjacent one end which engages the external threads 114 on the adjusting bolt 112. The adjusting nut 120 also includes hex flats 122 and an externally threaded end portion 124. The slots 110 in the arms 106 and 108 of the mounting plate 100 slidably engage the flats 122 on the adjusting nut 120 to slidably interconnect the clamping block 82 to the mounting plate 100.

A pivotal lever 130 includes a toothed aperture 132 which engages the external threads 124 on the adjusting nut 120. A lock nut 134 also engages the external threads 124 on the adjusting nut 120 to retain the lever 130 on the adjusting nut 120.

In operation, as shown in FIG. 2, the lever 130 is movable in any angular amount between a first upper position shown in solid in FIG. 2 to a second lower lock position shown in phantom in FIG. 2. While being urged clockwise to the lock position, the lever 130 rotates the adjusting nut 120 on the adjusting bolt 112 to force the arms 110 on the mounting plate 100 and the top side wall portions 94 and 96 of the clamping block 82 securely together in a fixed position about the steering column jacket 12. This locks the jacket 12 in a fixed position. Counterclockwise rotation of the lever 130 toward the first position releases the force on the adjusting nut 120 and enables the steering column jacket 12 to be pivoted about the first end 20 through a plurality of angular positions toward a bottommost position shown in phantom in FIG. 2. In any angular position of the jacket 12 between the positions shown by solid and phantom lines in FIG. 2, the lever 130 may be rotated to the second lock position to retain the jacket 12 and the entire steering column apparatus 10 in the desired angular position to suit a driver's preference and/or size.

A coil spring, not shown, is disposed about one end of the bolt 112 and connected to the lever 130 to exert a slight counterclockwise biasing force on the lever 130. The force is sufficient to latch the jacket 12 in the upper angled position shown in solid in FIG. 2. A slight downward force on the lever 130 will enable the jacket 12 to be moved from the first position to other angular positions.

Figure 9:
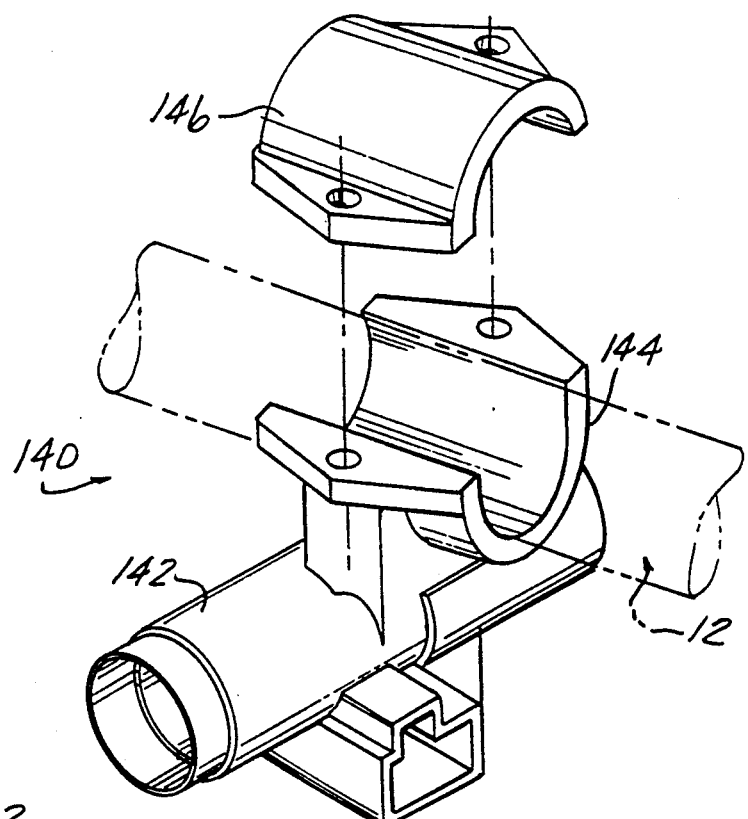
FIG. 9 is an exploded, perspective view of the ignition lock shown in FIG. 1.

Additional brackets or devices may also be mounted to the steering column jacket 12. As shown in FIG. 1, and in greater detail in FIG. 9, an ignition lock and switch assembly 140 is removably attached to the jacket 12, preferably adjacent the second bracket means 60. The ignition lock and switch assembly 140 includes a cylindrical housing 142 which receives a conventional ignition lock and switch mechanism. The housing 142 includes a generally U-shaped, open-ended sleeve 144 which is adapted to surround a lower portion of the steering column jacket 12. A mating arcuate shaped collar 146 is removably connected to the sleeve 144 via fasteners, not shown, to attach the housing 142 to the steering column jacket 12. The fasteners may be "breakaway" bolts to provide an anti-theft capability.

Although the ignition lock and switch assembly housing 142 has been described and illustrated as being separate from the second bracket means 60, it will be understood that the housing 142 may be integrated into a single piece unit with the second bracket means 60.

Figure 10:
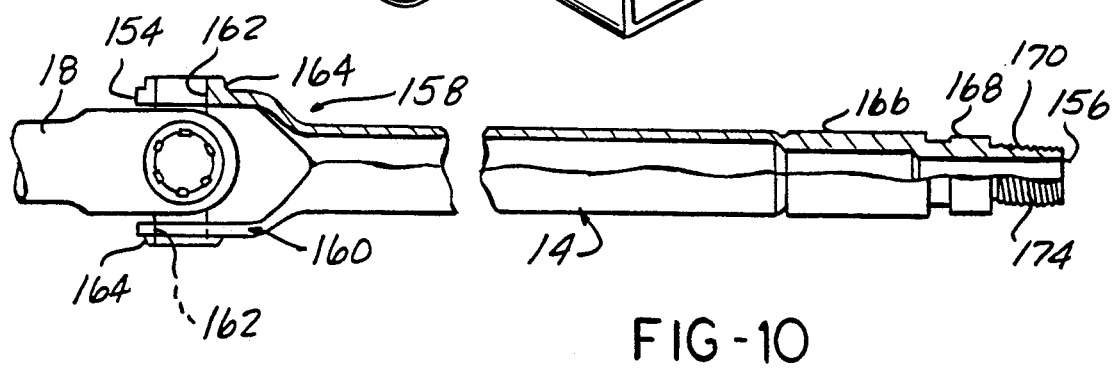
FIG. 10 is a partially cross-sectioned, side elevational view of the steering column shaft employed in the steering column apparatus shown in FIG. 1.

The steering column apparatus 10 of the present invention also includes a uniquely constructed steering column shaft 14. As shown in FIGS. 7 and 10, the steering column shaft 14 is formed as a hollow, tubular member of a high strength material, such as steel. The steering column shaft 14 is formed with a first end 154 and an opposed, second end 156.

According to the method of constructing the steering column shaft 14 of the present invention, a slit is formed in the first end 154 of the shaft 14 extending from the first end 154 along the longitudinal axis of the shaft 14 for a predetermined distance. The slit divides the first end 154 of the shaft 14 into two arcuate side wall portions. The two arcuate side wall portions are then shaped or bent into two spaced arms 158 and 160, as shown in FIG. 10, each having a generally planar end portion and an angular portion integrally connecting the end portion to the remaining portion of the shaft 14.

A conventional T-drilling operation is then applied to the arms 158 and 160 to form a bore 162 and an enlarged, outwardly extending projection or boss 164 in each of the arms 158 and 160. These operations form the first end 154 of the shaft 14 into a conventionally shaped yoke for interconnection to the tail shaft 18 in a normal manner. However, this yoke-shaped end portion is integral with the remainder of the shaft 14 thereby eliminating any separate operations which require attachment of a metallic yoke member to the shaft 14 by additional process steps, such as welding.

The opposite or second end 156 of the shaft 14 is shaped or formed via normal manufacturing processes into a series of consecutively smaller diameter shoulders 166, 168 and 170. Serrations are formed on the shoulder 168. Further, a steering wheel 16 fastening means, such as a plurality of external threads 174, for example, are formed on the shoulder 170 for interconnection to the steering wheel 16 in a normal manner.

Figure 11:
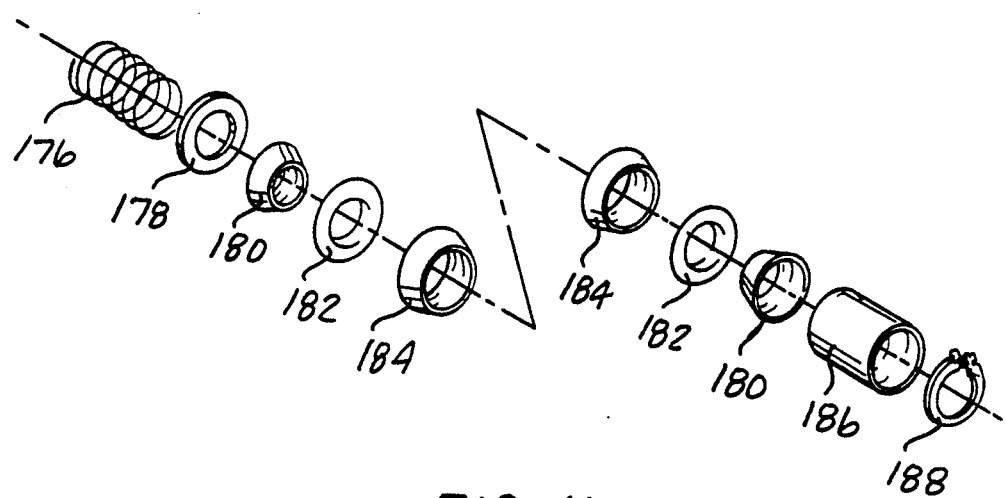
FIG. 11 is an exploded, perspective view of the bearing assembly employed with the steering column shaft.

As shown in FIGS. 7 and 11, a spring 176 abuts the first end 154 of the steering column shaft 14 and acts through a washer 178 onto a cone 180 to bias the cone 180 into contact with and to load a stamped bearing 182 mounted in a rubber compliance cup 184. An identical, but opposite facing arrangement of a cone 180, a bearing 182, and a compliance cup 184 are disposed over the opposed or second end 156 of the steering column shaft 14 and held in place by a spacer 186 and a retainer clip or snap ring 188 to mount the shaft 14 in the jacket 12 and to maintain the concentricity of the shaft 14 within the jacket 12.

In summary, there has been disclosed a unique steering column apparatus for motor vehicles which is constructed without any welding operations. First and second bracket means are fitted into opposite ends of the steering column jacket and provide interconnection of the steering column jacket to stationary vehicle structure and the vehicle steering wheel. A third bracket means is mounted to the jacket to provide tilting characteristics to the steering column apparatus.

The steering column shaft in the steering column apparatus of the present invention is uniquely constructed from a one-piece, integral hollow tubular member. The yoke-shaped end portion at one end of the shaft and the threaded end portion at the opposite end of the shaft are integrally formed in the hollow tubular member thereby eliminating the use of additional components and the normal welding operations employed to mount these components onto a conventional steering column shaft. This results in a steering column assembly having less weight, a lower manufacturing cost and greater reliability than previously constructed steering column apparatus.

What is claimed is:

1. A vehicle steering column apparatus comprising:
   a steering column shaft having first and second opposed ends;
   spaced first and second arms connected to the first end of the shaft having bored formed through the first and second arms with a common coaxial axis;
   means formed on the second end of the shaft for mounting a vehicle steering wheel;
   biasing means sheathing a first portion of the shaft disposed adjacent the first end of the shaft;
   first bracket means sheathing a second portion of the shaft and biased away from the first end of the shaft by the biasing means, the first bracket means pivotally connectible to the vehicle;
   a hollow tubular jacket sheathing a third portion of the shaft and having first and second ends;
   said first bracket means for supporting the first end of the jacket with respect to both the shaft and the vehicle;
   second bracket means sheathing a fourth portion of the shaft for supporting the second end of the jacket with respect to the shaft; and
   retaining means for preventing unintentional disassembling longitudinal movement of the second bracket means off from the second end of the shaft and for maintaining the biasing means, first bracket means, jacket and second bracket means in an assembled biased condition with the shaft rotatably supported by the first and second bracket means with respect to the jacket and the first and second ends of the shaft extending outward from the first and second ends of the jacket.

2. The vehicle steering column apparatus of claim 1 wherein the first bracket means comprises:
a yoke, the yoke including:
two spaced arms interconnected by a central end portion; and
a boss extending outward from the central end portion away from the two arms and fitted into the first end of the jacket;
a mounting plate connectible to the vehicle;
a pair of depending arms extending from the mounting plate and pivotally connected to the two arms of the yoke to pivotally connect the first end of the jacket to the vehicle.

3. The vehicle steering column control apparatus of claim 2 wherein the yoke is formed of a molded plastic.

4. The vehicle steering column apparatus of claim 1 wherein the second bracket means comprises:
a base;
a sleeve extending outward from one surface of the base and fitted into the second end of the jacket; and
means for releasably mounting the steering column switch means to the base.

5. The vehicle steering column apparatus of claim 1 further including:
third bracket means mounted to the jacket intermediate the first and second ends of the jacket, the third means being fixedly connectible to the vehicle;
the third bracket means including pivot means for pivoting the jacket about the first end; and
lock means for locking the pivot means in a predetermined position.

6. The vehicle steering column apparatus of claim 5 wherein the third bracket means and the lock means comprises:
a clamp block having a central bore extending longitudinally therethrough;
a slot formed in the clamp block and disposed in communication with the central bore in the block, the slot separating one wall of the clamp block into two spaced wall portions;
a transverse bore extending through the clamp block;
a threaded bolt having an externally threaded end portion extending through the transverse bore in the clamp block;
an adjustable nut mounted on the end of the bolt external from the clamp block;
an upper bracket connected to the vehicle;
at least one arm extending from the upper bracket;
a slot formed in the arm for receiving the threaded bolt therethrough; and
a pivotal lever mounted on the adjusting nut for moving the adjusting nut on pivotal movement of the lever between a first position locking the clamp block, the upper bracket and the steering column jacket in a fixed position relative to each other and a second position allowing the steering column jacket to pivot about its first end relative to the upper bracket.

7. The vehicle steering column apparatus of claim 6 wherein the lever is manually pivotal.

8. The vehicle steering column apparatus of claim 1 further comprising:
ignition switch means mounted on the jacket for receiving a vehicle ignition switch.

9. The vehicle steering column apparatus of claim 1 wherein the steering column shaft comprises:
a hollow, tubular member having first and second opposed ends; and
said spaced first and second arms integrally formed in the first end of the shaft as an integral extension of the tubular member.

10. The vehicle steering column apparatus of claim 1 wherein the tubular jacket comprises a one-piece member.

11. The vehicle steering column apparatus of claim 1 wherein the first bracket means is press fit into the first end of the jacket.

12. The vehicle steering column apparatus of claim 1 wherein the second jacket means is press fit into the second end of the jacket.

13. The apparatus of claim 1 wherein each of said first and second bracket means further comprises:
means for maintaining concentricity of the shaft in the jacket.

14. The apparatus of claim 13 wherein the means for maintaining concentricity further comprises:
first and second compliance cups sheathing a portion of said shaft adjacent said first and second ends of said jacket respectively;
first and second bearings sheathing a portion of said shaft adjacent said first and second compliance cups respectively; and
first and second cones sheathing a portion of said shaft adjacent said first and second bearings respectively for centering the shaft with respect to said first and second bearings as said first and second bearings are engaged between said first and second compliance cups and said first and second cones respectively when in said assembled biased condition.

15. The apparatus of claim 1 wherein said second bracket means further comprises:
means for removably receiving a lever controlled steering column switch means for operating vehicle devices upon selected pivotal movement of the steering column switch means lever.

16. A vehicle steering column apparatus comprising:
a hollow, tubular steering column shaft having first and second opposed ends, the shaft including spaced first and second arms on the first end of the shaft having bores formed through the first and second arms with a common coaxial axis, and means formed on the second end of the shaft for mounting a vehicle steering wheel;
biasing means sheathing a first portion of the shaft disposed adjacent the first end of the shaft;
first bracket means sheathing a second portion of the shaft and biased away from the first end of the shaft by the biasing means;
a hollow tubular jacket sheathing a third portion of the shaft and having first and second ends;
said first bracket means for supporting the first end of the jacket with respect to both the shaft and the vehicle, wherein the first bracket means includes a yoke having two spaced arms interconnected by a central end portion, a boss extending outward from the central end portion away from the two arms and interposed between the first end of the jacket and the shaft, a mounting plate connectible to the vehicle and a pair of depending arms extending from the mounting plate and pivotally connected to the two arms of the yoke to pivotally connect the first end of the jacket to the vehicle;

second bracket means sheathing a fourth portion of the shaft for supporting the second end of the jacket with respect to the shaft, wherein the second bracket means includes a base, a sleeve extending outwardly from one surface of the base and interposed between the second end of the jacket and the shaft, lever controlled steering column switch means for operating vehicle devices upon selected pivotal movement of the steering column switch lever means and means for releasably mounting the steering column switch means to the base; and retaining mans for preventing unintentional disassembling longitudinal movement of the second bracket means off from the second end of the shaft and for maintaining the biasing means, first bracket means, jacket and second bracket means in an assembled biased condition with the shaft rotatably supported by the first and second bracket means with respect to the jacket and the first and second ends of the shaft extending outward from the first and second ends of the jacket.

17. The vehicle steering column apparatus of claim 16 further comprising:

third bracket means mounted to the jacket intermediate the first and second ends of the jacket, the third means being fixedly connectible to the vehicle; and the third bracket means including pivot means for pivoting the jacket about the first end.

18. The vehicle steering column apparatus of claim 17 wherein the third bracket means comprises:

a clamp block having a central bore extending longitudinally therethrough;

a slot formed in the clamp block and disposed in communication with the central bore in the block, the slot separating one wall of the clamp block into two spaced wall portions;

a transverse bore extending through the clap block;

a threaded bolt having an externally threaded end portion extending through the transverse bore in the clamp block;

an adjustable nut mounted on the end of the bolt external from the clamp block;

an upper bracket connected to the vehicle;

at least one arm extending from the upper bracket;

a slot formed in the arm for receiving the threaded bolt therethrough; and a pivotal lever mounted on the adjusting nut for moving the adjusting nut on pivotal movement of the lever between a first position locking the clamp block, the upper bracket and the steering column jacket in a fixed position relative to each other and a second position allowing the steering column jacket to pivot about its first end relative to the upper bracket.

19. A method of assembling a steering column apparatus comprising the steps of:

providing a rotatable steering column shaft having first and second ends, the first end of the shaft having spaced first and second arms with bores formed through the first and second arms having a common coaxial axis;

first, slidably inserting biasing means over the second end of the shaft and sliding the biasing means along the shaft to a position adjacent the first end of the shaft;

second, slidably inserting first bracket means over the second end of the shaft and sliding the first bracket means along the shaft toward the first end of the shaft until biased by said biasing means away from said first end of the shaft;

third, slidably inserting an elongated jacket having first and second ends over the second end of the shaft and sliding the jacket along the shaft toward the first end of the shaft until the first end of the jacket is supported by the first bracket means;

fourth, slidably inserting second bracket means over the second end of the shaft and sliding the second bracket means along the shaft toward the first end of the shaft until the second bracket means supports the second end of the bracket; and installing retaining means on the shaft adjacent the second end of the shaft to maintain the biasing means, first bracket means, jacket and second bracket means in an assembled biased condition on the shaft with the first and second ends of the shaft extending outwardly beyond the first and second ends of the jacket.

20. The method of claim 19 further comprising the step of:

removably mounting a third bracket means to the jacket intermediate the first and second ends of the jacket, the third bracket means including pivot means connectible to the vehicle for pivoting the jacket about the first end of the jacket.

21. The method of claim 19 further comprising the steps of:

forming the steering column shaft as a hollow, tubular member having first and second opposed ends;

slitting the first end of the tubular member to form first and second opposed, separate, side wall portions;

bending the first and second side wall portions apart to form first and second spaced, opposed arms, each having planar end portions and an arcuate portion connecting the end portions to the tubular member;

T-drilling a boss and a bore in each of the end portions of the first and second arms, the bores in each of the first and second arms being co-axially aligned; and forming a steering wheel means fastening means on the second end of the tubular member.

22. The method of claim 19 wherein the step of fitting the first bracket means comprises the step of press fitting the first bracket means into the first end of the jacket.

23. The method of claim 19 wherein the step of fitting the second bracket means comprises the step of press fitting the second bracket means into the second end of the jacket.

* * * * *